United States Patent [19]

Pizzanelli

[11] Patent Number: 5,623,347
[45] Date of Patent: Apr. 22, 1997

[54] HOLOGRAMS FOR SECURITY MARKINGS

[75] Inventor: David J. Pizzanelli, London, England

[73] Assignee: Light Impressions Europe PLC, Leatherhead, England

[21] Appl. No.: 167,997

[22] PCT Filed: Jun. 19, 1992

[86] PCT No.: PCT/GB92/01115

§ 371 Date: Jun. 2, 1994

§ 102(e) Date: Jun. 2, 1994

[87] PCT Pub. No.: WO93/00224

PCT Pub. Date: Jan. 7, 1993

[30] Foreign Application Priority Data

Jun. 21, 1991 [GB] United Kingdom .................. 9113462

[51] Int. Cl.⁶ ........................................................ G03H 1/00
[52] U.S. Cl. ................................. 359/2; 359/24; 359/32
[58] Field of Search ................................. 359/2, 3, 9, 24, 359/32, 33, 572; 380/54; 283/86

[56] References Cited

U.S. PATENT DOCUMENTS

| | | | |
|---|---|---|---|
| 3,565,978 | 2/1971 | Folger | 264/1.34 |
| 3,633,989 | 1/1972 | Benton | 348/40 |
| 4,171,766 | 10/1979 | Ruell | 235/487 |
| 4,631,222 | 12/1986 | Sander | 428/172 |
| 4,773,718 | 9/1988 | Weitzen | 359/3 |
| 4,839,250 | 6/1989 | Cowan | 430/1 |
| 4,856,857 | 8/1989 | Takeuchi et al. | 359/3 |
| 4,913,504 | 4/1990 | Gallagher | 359/1 |
| 5,145,212 | 9/1992 | Mallik | 283/86 |

FOREIGN PATENT DOCUMENTS

| | | |
|---|---|---|
| 3840037 | of 0000 | Germany . |
| 3422908 | of 0000 | Germany . |
| 61-176969 | 8/1985 | Japan . |
| 1280625 | of 0000 | United Kingdom . |
| 2092952 | of 0000 | United Kingdom . |
| 2129739 | of 0000 | United Kingdom . |

OTHER PUBLICATIONS

Patent Abstracts of Japan, vol. 12, No. 354 (P–761) 22 Sep. 1988 & JP,A,63 106 779 (Toppan Printing) 11 May 1988.
Patent Abstracts of Japan, vol. 12, No. 334 (P–756) 8 Sep. 1988 & JP,A,63 096 689 (Toppan Printing).
Patent Abstracts of Japan, vol. 7, No. 134 (p. 203), 11 Jun. 1983 and JP–A–58,050,073 (Anritsu Denki).

*Primary Examiner*—Paul M. Dzierzynski
*Assistant Examiner*—Darren E. Schuberg
*Attorney, Agent, or Firm*—Ladas & Parry

[57] ABSTRACT

A hologram for security markings is provided by a laser transmission hologram (1–4) formed as a surface relief pattern and a coating of a thin metallic layer (5) on the surface relief pattern whereby the hologram is capable of reflecting light from a laser (10). The metallic layer is, preferably, about 500 angstroms thick and the hologram may be mounted on a substrate (7) of an item required to bear the security marking defined by the hologram. In a feature of the invention an apparatus is provided for reading light reflected from the hologram comprising a laser (10) for projecting a beam (9) onto the hologram to be read and a detector (31) and associated logic devices for recognizing a real image of the hologram. The apparatus has the advantage that the laser (10) and detector (31) are both located on the same side of the hologram to be read.

9 Claims, 4 Drawing Sheets

HOLOGRAMS FOR SECURITY MARKINGS

BACKGROUND OF THE INVENTION

1. Field of the Invention

This invention relates to a hologram for security markings, to a method of making the same and to an apparatus and method for reading light reflected from the hologram.

2. Description of the Related Art

The invention generally relates to holograms for security markings for documents, commercial goods and packaging. Holograms have a high degree of security because they are difficult to reproduce and hard to simulate by conventional printing methods. Numerous prior art patents are known which disclose the use of visually discernible holograms for authenticating commercial goods, packages and documents of value such as bank notes, bonds and vouchers. For example, GB-A-2092952 discloses an arrangement for identifying an article which comprises producing a holographic image on a sheet or film and embodying the sheet or film with the image into the article or its packaging. The holograms most suited for use in product authentication are those produced by embossing into thermo-plastic and various known methods are described in U.S. Pat. No. 4,773,718. A particular method of making an embossable hologram is disclosed in U.S. Pat. No. 3,565,978 having the steps of forming a surface deformation pattern in an insulating thermo-plastic layer, treating the surface to harden or toughen it, forming a first generation replica by applying a curable casting material, curing the casting material to form a negative replica to form a first generation negative replica, forming a second generation replica that is cast from the first generation replica, transferring the second generation replica to a support device to form a final positive replica of the image, silvering the second generation replica, electroforming a metal surface on the silvered second generation replica, separating the metal layer from the second generation replica to form a third generation metal negative replica and pressing a thermo-plastic preform against the metal replica to form a fourth generation final positive replica of the original image.

A further example of the use of embossed holograms as security devices is described in GB-A-2129739 which discloses incorporating a hologram into hot stamping foil so that the hologram may be intimately bonded to a substrate in such a way that the hologram cannot be removed without destruction of the hologram.

All the above disclosed prior art patents relate to holograms which are embossed and which may be used as a security means, but which diffract incident white light into a plurality of spectral colours. Such a hologram is sometimes known as a "Benton" hologram or a "rainbow" hologram because of the manner in which the holograms diffract incident white light into its spectral components and it is believed that the origination of such a hologram was first disclosed by Benton in U.S. Pat. No. 3,633,989.

The bright diffractive colours associated with a rainbow hologram are usually deemed an advantage because the colours are easily discernible in ordinary white light, such as the light from the sun or a spotlight or domestic lamp. However, there are instances where the discernible, visible hologram image is not an advantage and a more discrete, covert, form of authentication is preferred.

It is a first object of this invention to provide a hologram for security markings and, in another aspect, to provide a method of making a hologram for security markings. Features of this invention include apparatus and a method of reading said hologram.

SUMMARY OF THE INVENTION

According to a first aspect of this invention there is provided a hologram for security markings comprising a laser transmission hologram known per se formed as a surface relief pattern embossed into an embossable material, said laser transmission hologram being formed by sequential layers of a carrier layer, an embossable thermo-plastic lacquer into which the hologram is formed, and a layer for adhesively bonding the hologram to a substrate, characterised in that a thin metallic layer is coated onto said thermo-plastic lacquer whereby the laser transmission characteristics of the hologram are transformed into laser reflection characteristics capable of reflecting light from a laser.

Preferably, the metallic layer is about 500 angstroms thick.

Advantageously, the hologram is mounted on a substrate of an item required to bear the security marking defined by the hologram.

In a feature of the invention there is provided an apparatus for reading light reflected from a hologram, in accordance with the first aspect of this invention, comprising a laser light source for projecting a laser light beam onto the hologram to be read, and means located on the same side as the laser light source for recognising a real image of the hologram.

Advantageously, means are provided for moving the hologram with respect to the laser light beam and for activating said laser.

In one embodiment, the hologram comprises an information image and a triggering image.

Advantageously, a plurality of triggering images are overlaid on respective information images, the spacing between the triggering images being at least equal to the diameter of the laser beam.

In said one embodiment, preferably the information image is a series of light reflective portions and light non-reflective portions, together forming a binary code, the triggering image being formed to indicate the presence of a light reflective portion and so as to reflect the laser light beam at a different angle to that reflected by the information image, there being provided a light detector for receiving the information image and a further light detector for receiving the triggering image, whereby the light detector is activated only when triggered by a signal from the further light detector indicating the presence of a light reflective portion.

The light detector may be a charged coupled device (CCD) arranged to provide output from a frame grabber, and logic means are provided to analyse the output of the frame grabber for determining the presence of a valid binary code.

In a further feature of this invention there is provided an apparatus for reading light reflected from a hologram wherein said hologram comprises an information image and a triggering image, said apparatus comprising a laser light source for projecting a laser light beam onto the hologram to be read, light detector means including means for receiving laser light reflected from the information image and means for receiving laser light reflected from the triggering image, said information image light receiving means being in communication with said triggering image receiving means so as to be activated only when triggered from a signal from said triggering image receiving means, said information image light receiving means being connected to a logic means for detecting the presence of a valid reflected signal.

According to another aspect of this invention there is provided a method of making a hologram for security in accordance with the first aspect of this invention including the steps of forming a laser transmission hologram as a surface relief pattern on a photoresist material by exposing the photoresist material to laser light and to a desired pattern, applying a metallic coating to the pattern on the photoresist material, and embossing the surface relief pattern into a thermo-plastic lacquer of a hot stamping foil having a coating of thin metallic layer to form a hologram capable of reflecting light from a laser.

Conveniently, the thin metallic layer is coated on the lacquer of the hot stamping foil either before or after the embossing step.

Preferably, the method further includes the steps of coating the thin metallic layer with adhesive and applying the hologram to a substrate under heat and pressure.

A method of reading light reflected from a hologram made in accordance with said another aspect of this invention including the steps of projecting a laser light beam onto the hologram to be read and positioning a light detector on the same side of the hologram as the laser light source for recognising a real image of the hologram and for discriminating said image from a non-valid image.

In one embodiment of the invention said image is a bar code formed of a series of light reflective portions and light non-reflective portions.

In an embodiment, a triggering image is formed to indicate the presence of said light reflective portions and to reflect the laser light beam at a different angle to that reflected by an information image formed to indicate the presence of said non-reflective portions, said information image being detected by a light detector which is activated only when triggered by a signal from a further light detector positioned to indicate the presence of the light reflective portion derived from the triggering image.

BRIEF DESCRIPTION OF THE DRAWINGS

The invention will now be described, by way of example, with reference to the accompanying drawings, in which.

In the Figures like reference numerals denote like parts.

DESCRIPTION OF THE PREFERRED EMBODIMENTS

Figure 1:
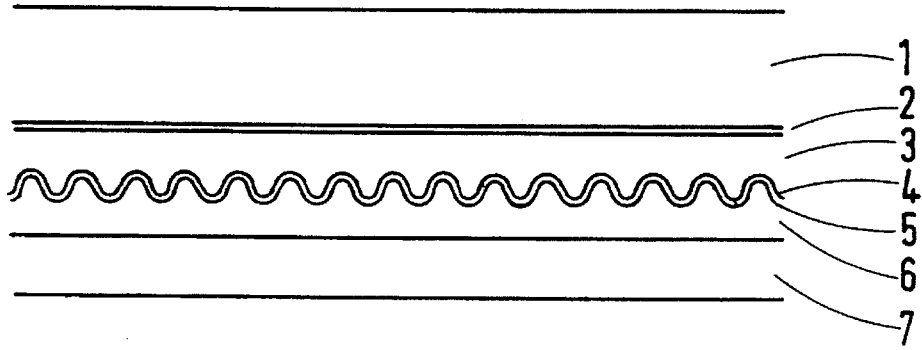
FIG. 1 shows in schematic form a cross-section through a hologram for security markings in accordance with this invention.

The hologram shown in FIG. 1 has the sequential layers of a polyester carrier layer 1 of thickness approximately 20 microns, a release layer 2, for example a wax coating, of a few angstroms thick, and an embossable thermo-plastic lacquer 3 into which a laser activated hologram 4 is embossed. A surface relief profile of the laser activated hologram 4 is approximately 0.4 to 0.9 microns in depth. The steps for forming the hologram thus far, which is a conventional laser transmission hologram, may be by the steps enumerated in U.S. Pat. No. 3,565,978. Thus, for example, photoresist material is coated on glass and the photoresist material is exposed to laser light projecting a real image of a marking to form the basis of the hologram as a real image on the photoresist material. The marking may be, for example, a bar code formed by a plurality of light (reflective) and dark (non-reflective) bars. The photoresist is then developed by etching which is used to grow a metallic master hologram in nickel. Thin nickel copies are made from the nickel master and the nickel copies are used to physically emboss, by means of heat and pressure, the surface relief hologram into the thermo-plastic lacquer layer of a hot stamping foil. Following the embossing step, the laser transmission hologram, thus formed, is coated with a fine metallic layer 5 by vacuum deposition to about 500 angstroms thickness sufficient to cover the microscopically fine undulations of the surface relief profile of the hologram. Alternatively, the embossing step may be performed into a lacquer layer which has previously been coated with a thin metallic layer. The step of providing the metal coating 5 transforms the laser transmission characteristics of the hologram to laser reflection characteristics. A heat activated adhesive layer 6 is then used to bond the layers 3, 4, 5 and 6 to a substrate 7 when blocked down under heat and pressure by a heated dye of a hot stamping foil machine.

Thus, a laser transmission hologram is formed in similar manner to that disclosed in U.S. Pat. No. 3,565,978 but, after the surface relief hologram is embossed into the lacquer of a hot stamping foil, then the hot stamping foil lacquer is coated with the metallic layer 5 and the metallic layer 5 converts the transmission characteristics of the hologram into reflection characteristics. The hot stamping foil lacquer is coated with the heat activated adhesive 6 in the same way as is known per se with hot stamping foil.

Figure 2:
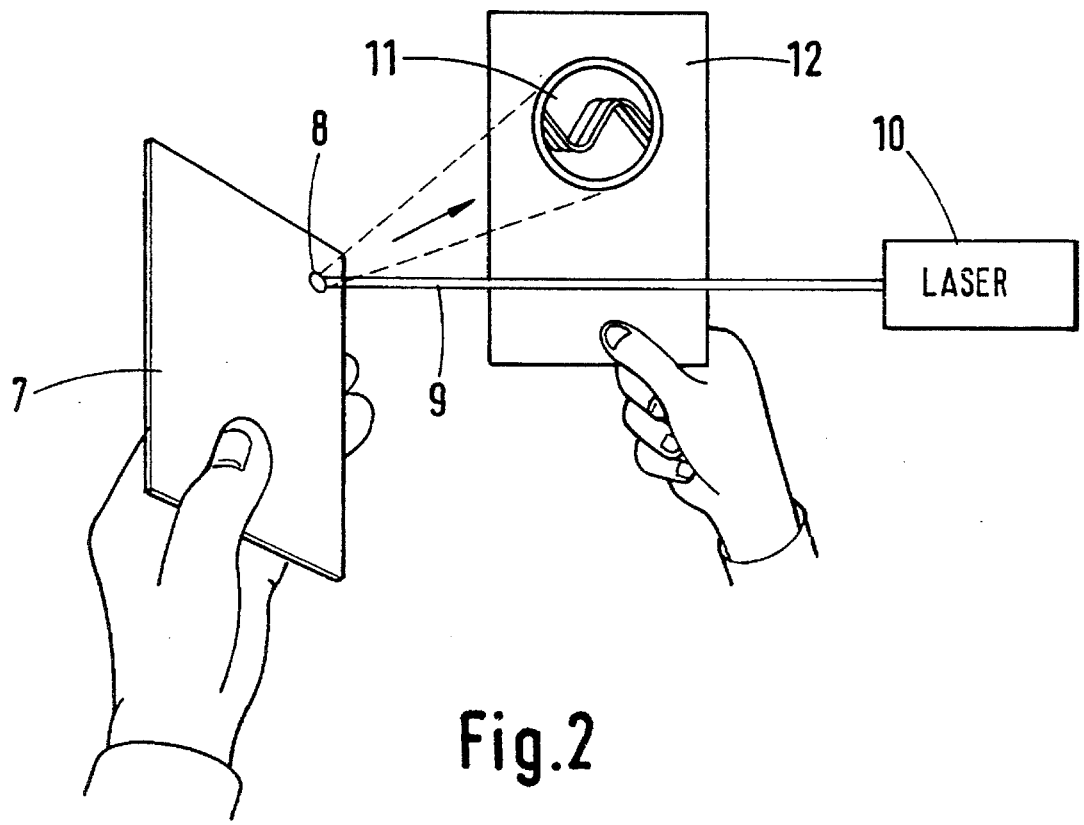
FIG. 2 shows one embodiment of reading the hologram of FIG. 1.

Referring to FIG. 2, the hologram image 8, thus formed, by the process steps shown in FIG. 1, forms a small area of the substrate 7. The area of the hologram of blocked foil may be in the form of a small dot no larger than the diameter of an unexpanded laser beam 9. Alternatively, the laser reflection hologram may be in the form of a bar code, as mentioned above, or in the form of alpha-numerics or in the form of an image such as a company logo.

The hologram image 8 is viewed by directing a beam 9 from a small laser 10, such as a helium-neon gas laser, or a laser diode, onto the substrate 7 which is to be authenticated or covertly marked, the substrate 7 being, for example, a document of value, a credit card, passport, visa, bond or other paper or plastic item or may be a commercial item or product or the packaging used to wrap or contain a commercial item or product. Because the laser reflection hologram formed by this invention does not need the hologram image 8 to be impinged by the laser beam, so it is merely necessary for the laser beam 9 to strike the surface of the substrate 7. Thus, the laser reflection hologram of this invention has the great advantage that exact registration of the hologram on the foil of the substrate is not necessary, in distinction to conventional holographic hot stamping foil holograms. This is because the reflection hologram has the property that any part of the entire surface of the foil bearing the laser reflection hologram may be activated by the laser to project an image so that illumination of any part of the foil substrate with the laser will cause the hologram to be reflected. Thus, the image reflected from the substrate 7 may be viewed as a magnified image 11 projected as an aerial image that is made visually discernible by reflection off the surface of a piece of white card 12; a sheet of paper or any convenient light-colored, smooth, diffusely-reflecting surface may, alternatively, be employed.

Thus, the invention described thus far produces a hologram capable of reflecting light from a laser to produce a magnified image on a reflecting surface and also has the advantage that any part of a substrate surface that receives a beam from a laser will reflect the hologram image so that it is not necessary for the hologram image, itself, to be illuminated by the laser.

It may, alternatively, be required for an optical registration mark to be recorded alongside the laser reflection hologram so that the registration mark acts as a datum to permit exact registration of the foil in the hot stamping step. Such a registration mark may ensure that the hologram is always positioned in the same place when it is transferred onto the substrate, in much the same manner as in conventional holographic hot stamping foil techniques. Although the criteria for exact registration is less exacting for the laser reflection hologram disclosed herein than for conventional embossed holograms, there may be occasions when exact positioning is beneficial so that the laser projected image may be quickly and accurately located on playback.

As has been mentioned above, the present invention may be used with particular advantage with a bar code comprising light and dark strips of predetermined form, known per se. Bar codes have numerous commercial applications, for example in identifying rail cars and in identifying product and price of goods in stores. In 1973 the Universal Product Code symbol was adopted, namely 1974 CODE 39. Bar codes encode information along one dimension with intervals of alternating reflectivity, usually black and white shades.

In the prior art, bar codes are printed using several different methods, such as by wet-ink printing, formed font or drum printing, photo-composition, dot matrix, thermal transfer, xerographic, ion deposition, or ink jet, depending on the particular application of the bar code. The printing of bar codes may occur either "off-site" or "on-site". Off-site printing is usually performed at a location other than that where the bar codes will be used and is performed in a batch mode in which a large quantity of codes are printed at one time on label stock or on packaging or product containers. On-site printing is performed on demand as individual products or items are packaged and, in such an instance, the bar codes will each be unique to the particular article which is to be encoded.

A feature of this invention provides an apparatus for reading bar codes that are currently expected to be produced off-site to identify type of product or batch of products.

It is known in the prior art to read printed bar codes automatically by a bar code reader which is a device which emits a beam of light and collects the light reflected from the pattern of bars and spaces and turns the reflected light into a series of electrical impulses, and a decoder is used to interpret the electrical impulses and to convert the impulses into a form which can be used by a computer and/or visual display unit. The decoder must, therefore, determine which elements are the bars and calculate the relative width of each element in order to decode the data encoded in the bar code. To provide constant and accurate results, bar code readers require high quality symbols that are printed within specified tolerances, such as the exact width of the bars and spaces and the amount of white spaces at the beginning and end of each symbol. The specifications are carefully defined and are available from the Automatic Identification Manufacturers' Association, Pittsburg Pa., U.S.A.

The performance of a bar code system is measured by the "first read rate" which is the ratio of the number of successful reads on the first attempt to the total number of attempts, expressed as a percentage. The first read rate for a bar code should be better than 85% and is typically about 90%.

Factors which detract from a perfect system are poor printing, paper stretching, ink bleed, dirt and surface contamination of the bar code labels or markings.

It is known in the field of holography to encode plastic cards and other items by means of diffraction gratings and holograms and many different systems of automatically detecting the light diffracted therefrom are known.

An example is disclosed in GB-A-1280457 which discloses a recorded hologram of identification indicia wherein the recorded information corresponds to a given pattern of spaced points of light. When such a hologram is illuminated with an appropriate read-out laser beam of light, a reconstructed image of the given light pattern is obtained on the opposite side of the hologram from the laser light source and an appropriate decoder having a separate light sensing element photodetector located to align with each point of the reconstructed pattern determines a given number associated with the card in accordance with the predetermined binary code manifested by the reconstructed image of the given pattern. Because a light sensing element is required at each point, the decoder must be dedicated to reading only one specific code and cannot read different codes, such as might be employed on different stock items or bank cards. Such an identification reader system also requires precise registration between the card and the location of the bar code.

Similarly, U.S. Pat. No. 3,643,216 discloses a hologram on a plastic card resulting from the interference of a particular sub-set of spaced mutually coherent information light beams. Upon illumination, the plurality of light beams is detected by a matrix of spaced photo cells, a separate photo cell corresponding to each position where a distinct beam of light may be projected. Also, disclosed in GB-A-1452518 is a hologram which provides a unique pattern formed of sets of output light beams grouped in circles and an automatic hologram reader which will detect the set of light beams.

In the above prior art disclosures there is required a photodetector corresponding to each position where a bar may be located. The present invention, in a feature, seeks to overcome this disadvantage.

What all the machine readable holograms and diffraction gratings in the above prior art examples do not provide, due to physical limitations, of the readers or of the encoders, or both, is a means of encoding and decoding which is compatible with established bar code information theory, as defined in practice by the Automatic Identification Manufacturers' Association.

By coating a laser transmission hologram which has been embossed into a hot stamping foil lacquer with the layer of metal 5 after the embossing step, or by embossing into a lacquer layer which has previously been coated with a thin metallic layer, the laser transmission hologram is transformed into a laser reflection hologram, thereby allowing for the reconstruction of a projected real image of the bar code from the same side of the hologram as the reference beam rather than from the opposite side of the hologram, which would require that the beam penetrate and be transmitted by the substrate in order to illuminate the hologram and project the real image of the bar code.

Figure 3:
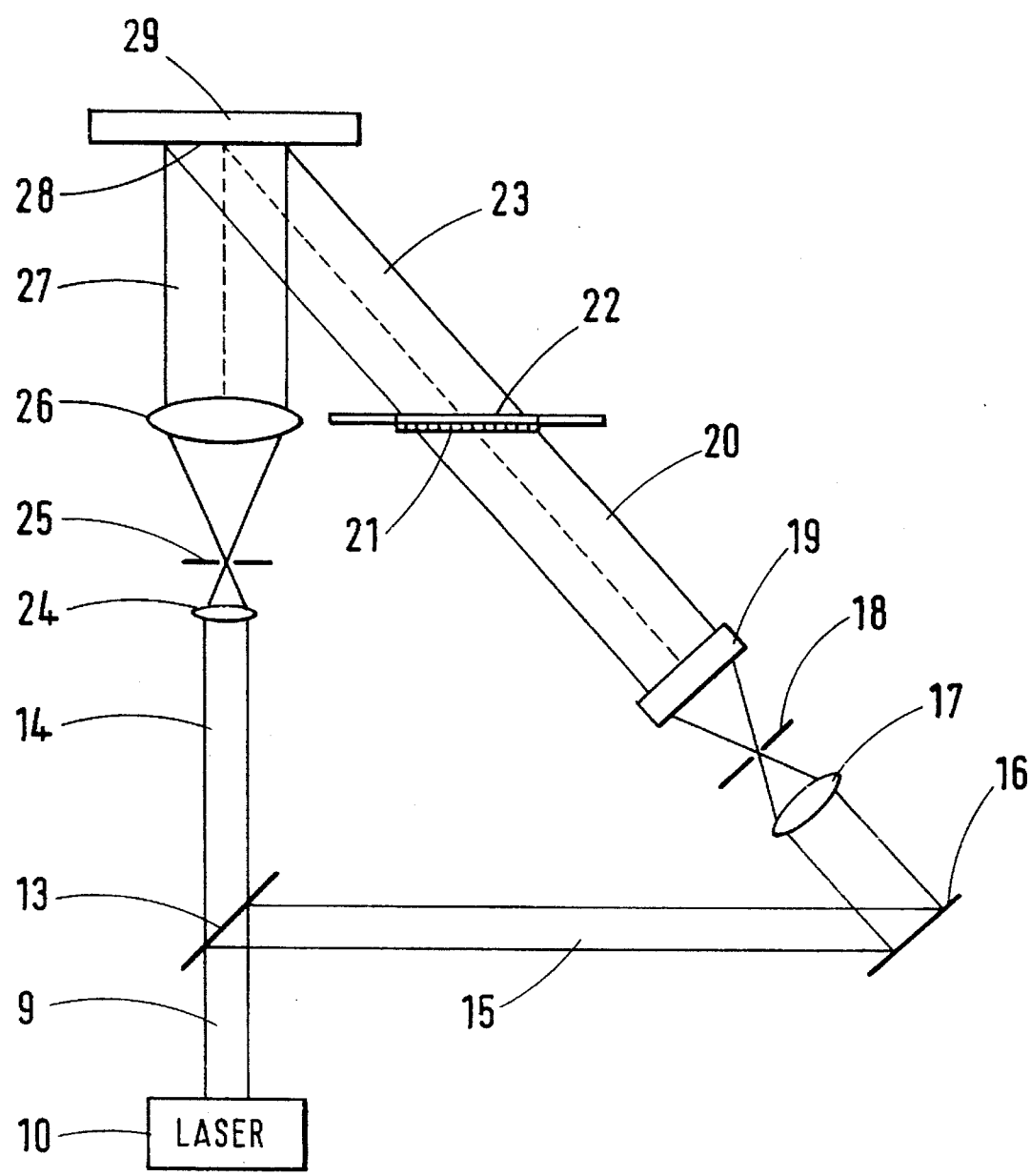
FIG. 3 shows in schematic form an apparatus for the formation of a laser transmission hologram in which the projected real image is a bar code.

The apparatus shown in FIG. 3 has the laser 10 emitting the beam 9 of coherent mono-chromatic light which is divided into two beams by a beam splitter 13. One of the beams, beam 14 which passes through the splitter 13, is directed to a lens 24 and, then, through a spatial filter 25 which is provided at the focal point of a lens 26 so that the beam 27, which is transmitted through the lens 26, is collumated. The other beam 15 that is provided by the splitter 13 is directed to a mirror 16 and, then, to a lens 17 and spatial filter 18. Light output from the spatial filter 18 is directed to a cylindrical lens 19 which forms the beam into a perpendicular slit beam 20. The beam 20 is directed to a diffusing plate 21 situated immediately behind transparent bar code artwork 22. Light 23 which emanates from the bar code artwork 22 is a diffused and coded wavefront. At a surface 28 of a photoresist plate 29 there is formed a latent surface relief pattern caused by the interference of the beam 28 and encoded wavefront 23. Upon development, the latent surface relief pattern is revealed and used to generate metallic masters for electroforming.

A laser reflective bar code hologram is, thus, formed having the configuration of that shown in FIG. 1 in which the bar code hologram is embossed in the embossable thermoplastic lacquer layer 3, layer 4 being the surface relief profile of the laser reflection bar code hologram.

Figure 4:
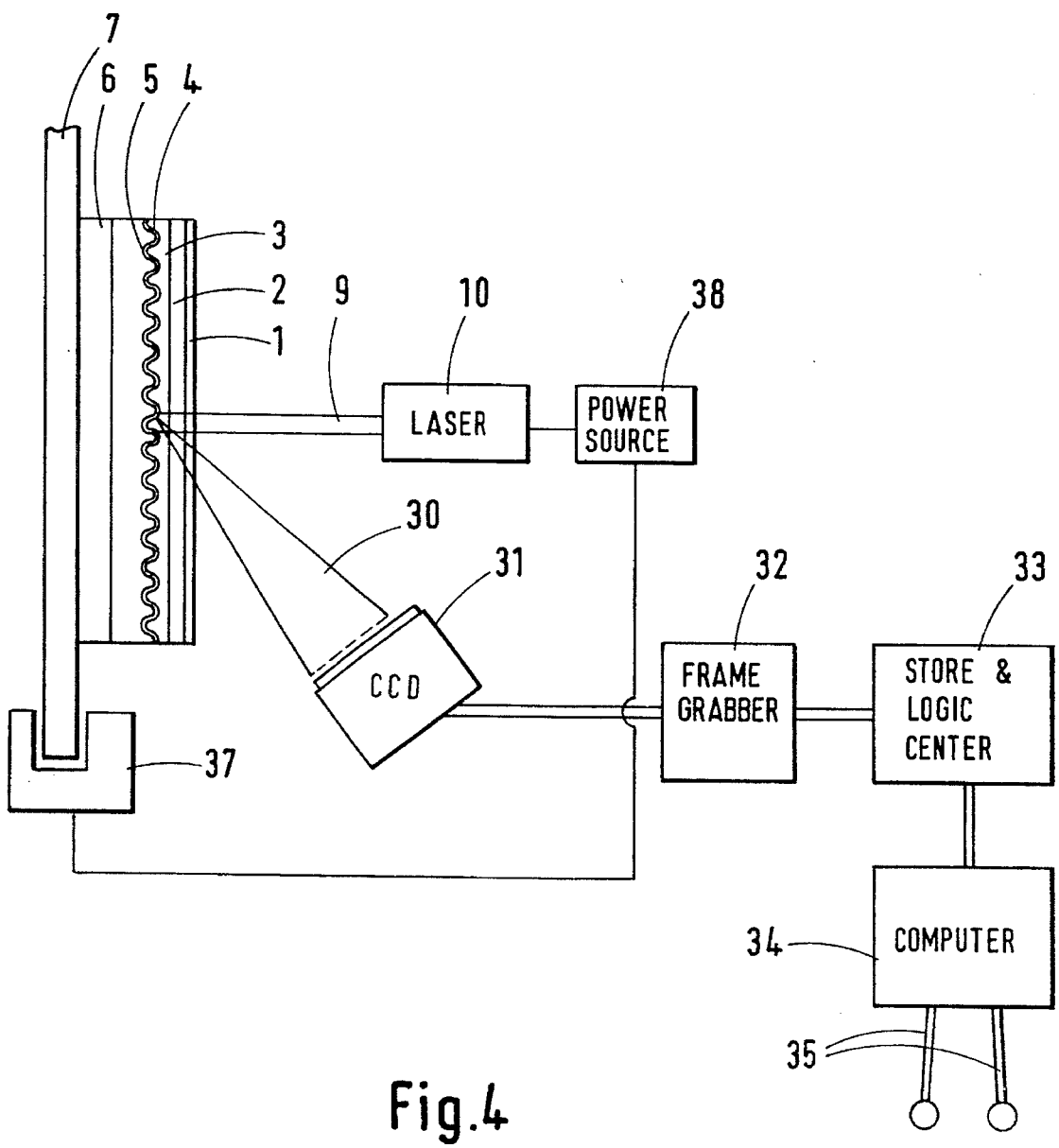
FIG. 4 shows in schematic form another embodiment of an apparatus for reading a hologram in accordance with this invention.

An apparatus for reading the laser reflection bar code hologram will now be described with reference to FIG. 4.

The plastic card or substrate 7 bearing the hologram layers 3, 4, 5, bonded into position by adhesive layer 6, is mounted into an activating mechanism 37, which may be a simple electrical contact and spring, which activates a power source 38 to energise the laser 10. The mechanism 37 is also arranged to traverse the card or substrate past the laser beam 9 so the bar code can be read sequentially. Laser beam 9 is emitted from the laser 10 to illuminate the surface relief reflection hologram 5 through the transparent embossable thermo-plastic layer 3. Laser reflection hologram surface 5 diffracts laser beam 9 to form a projected image 30 which is a real image of the bar code artwork. Projected image 30 is detected by a charge couple device (CCD) 31 which is electrically connected to a frame grabber 32. The image 30 which has been detected by the CCD 31 is apprehended and retained by the frame grabber 32. The image 30 retained by the frame grabber 32 is stored in a logic center 33 where it is converted into a stream of binary information. The stream of binary information from the logic centre 33 is applied to a computer 34 where it is recognised as a bar code by, for example, recognition of a start bit, and is decoded. The computer 34 is connected to activate an indication means 35 to indicate that a bar code in the form of binary information has been recognised. The computer 34 is programmed to search for the stream of binary information (data) amongst a longer stream of arbitrary binary information. This provides a major advantage of a feature of this invention over the methods described above in the prior art, since it greatly reduces the requirement for exact mechanical alignment of the projected hologram image and the image detection means. In the feature of this invention, the image merely has to be detected somewhere on the surface of the CCD but does not have to have an exact correspondence pixel, as is required in the prior art.

Practical applications for the feature of this invention in providing automatic recognition of bar code hologram images are numerous, but in the context of the invention, the primary application envisaged would be the provision of secure identification systems for the authentication of retail goods and merchandise. In this respect, small bar code holograms could be placed onto commercial items or onto the packaging or containers in which they are sold in the form of either self-adhesive stickers or as hot stamping foil bonded to the item or container by heat and pressure.

Small machine readable bar code holograms could also provide secure identification for plastic cards, such as credit cards, used to purchase goods and services on credit, bank cheque cards used to guarantee monetary transactions, or for access control cards, such as would permit the authorised holder to gain access to secure facilities or use restricted equipment.

Figure 5:
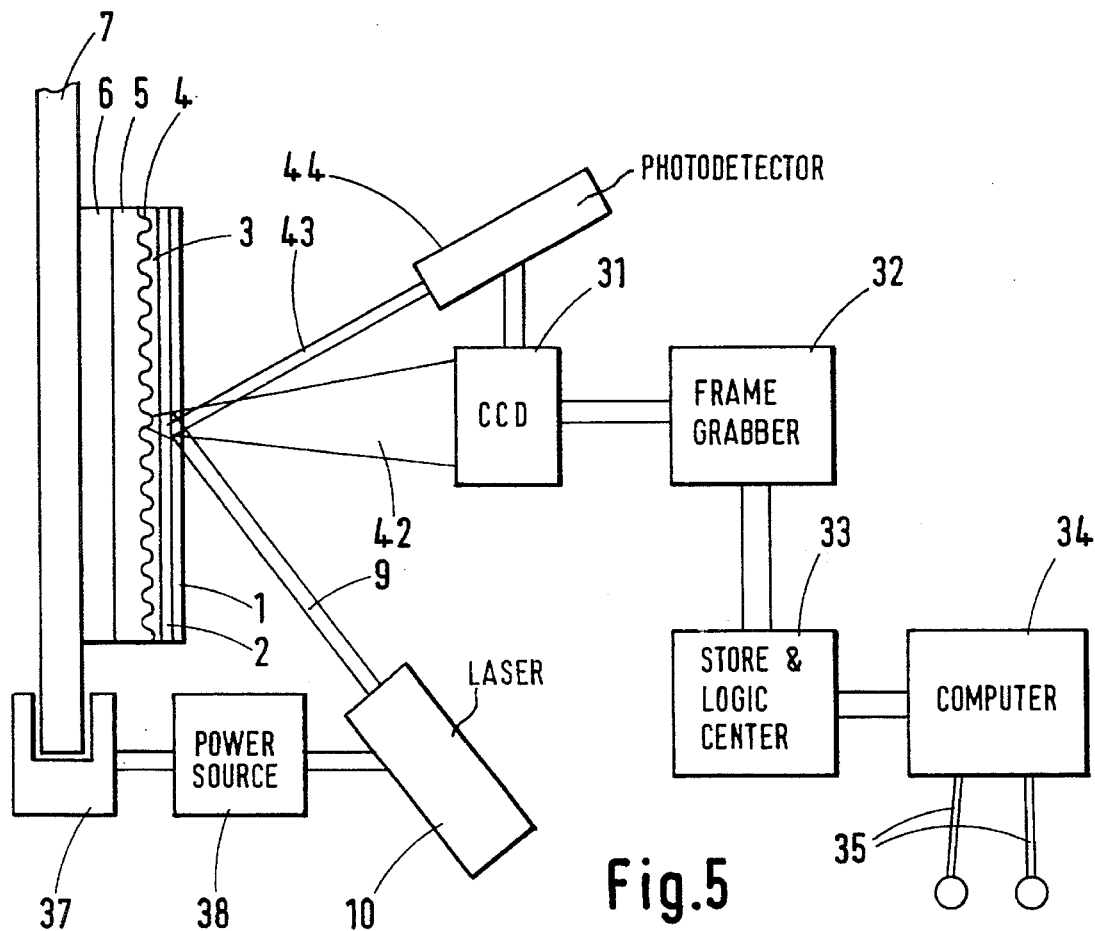
FIG. 5 shows in schematic form a further apparatus for automatically reading a hologram in accordance with this invention.

The further hologram reading apparatus shown in FIG. 5 is activated by mechanism 37, as described above, with reference to FIG. 4, which activates power source 38 to energise laser 10. Laser beam 9 illuminates the hologram surface which is reflected to form a projected image 42 and a projected "triggering" light beam 43 which is not part of the image to be decoded. Projected image 42 is detected by the CCD 31 whilst projected light beam 43 is detected by a photodetector 44. Upon detecting the light beam 43, the photodetector 44 triggers the CCD (as shown) or, alternatively, the frame grabber 32 over a communication path (not shown) to grab the image 42 detected by the CCD 31. The image 42 retained by the frame grabber 32 is stored in the logic centre 33 where it is converted into a stream of binary information. The binary information stream from the store and logic center 33 is passed to the computer 34 where it is recognised as representing the projected image 42. The computer 34 activates an indication means 35 to indicate that image 42 in the form of binary information has been recognised, as above described.

Figure 6:
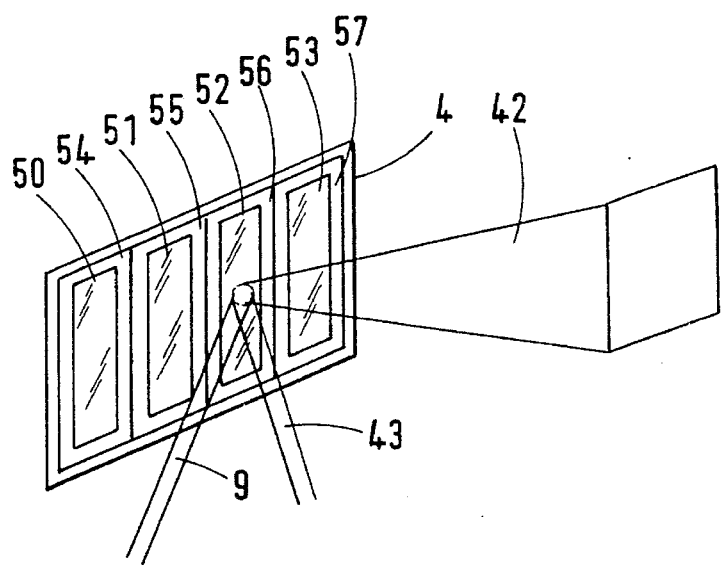
FIG. 6 shows a schematic view of one embodiment of a hologram surface.

The reading device described with reference to FIG. 5 is intended to be utilised with a particular embodiment of the reflective hologram which will now be described with reference to FIG. 6. The hologram surface 4 is formed of images 50–53 which are overlaid onto images 54–57, the area of the images 50–53 being smaller than the area of the respective images 54–57. The areas 50–53 are areas of the hologram arranged to project the beam of light 43 to be directed to the photodetector 44 (not shown in FIG. 6), and the areas 54–57 are active image areas arranged to project images 42 onto the CCD (not shown in FIG. 6) When any part of the respective image areas are illuminated, because the image areas of the hologram 50–53 are superimposed onto the areas 54–57, so both the image projected onto the CCD and the beam projected onto the photo projector are projected simultaneously. Thus, for example, area 52 is superimposed onto area 56 so that beam 43 and image 42 are projected at the same time.

The spacing between the images 50–53 is at least equal to the diameter of the laser beam 9. The frame grabber is activated only when an image from areas 50 and 54, or 51 and 55, or 52 and 56, or 53 and 57 are simultaneously detected.

By such an arrangement, as the hologram travels laterally past the laser beam 9, images 54–57 are only sampled by the frame grabber 32 when the images are correctly projected onto the surface of the CCD. When areas of adjoining holograms 55 and 56 are both partially illuminated by the laser beam 9, a combined image is projected onto the CCD, but this is ignored because the frame grabber is not activated.

I claim:

1. An apparatus for reading light reflected from a hologram and a hologram for security markings comprising a laser transmission hologram known per se formed as a surface relief pattern embossed into an embossable material, said laser transmission hologram being formed by sequential layers of a carrier layer, an embossable thermo-plastic lacquer into which the hologram is formed, and a layer for adhesively bonding the hologram to a substrate, a thin metallic layer coated onto said thermo-plastic lacquer whereby the laser transmission characteristics of the hologram are transformed into laser reflection characteristics capable of reflecting light from a laser, said apparatus comprising a laser light source for projecting a laser light beam onto the hologram to be read, and means located on the same side as the laser light source for recognising a real image of the hologram, said hologram having an information image and a triggering image, said information image being a series of light reflective portions and light non-reflective portions, together forming a binary code, said triggering image being formed to indicate the presence of an information image area and so as to reflect the laser light beam at a different angle to that reflected by said information image, and a light detector provided for receiving said information image and a further light detector provided for receiving said triggering image, whereby said light detector is activated only when triggered by a signal from said further light detector indicating the presence of a light reflective portion.

2. An apparatus as claimed in claim 1 wherein the metallic layer is about 500 angstroms thick.

3. An apparatus as claimed in claim 1 wherein the hologram is mounted on a substrate of an item required to bear the security marking defined by the hologram.

4. An apparatus as claimed in claim 1 wherein means are provided for moving the hologram with respect to the laser light beam and for activating said laser.

5. An apparatus as claimed in claim 1 wherein a plurality of triggering images are overlaid onto respective information images, the spacing between the triggering images being at least equal to the diameter of the laser beam.

6. An apparatus as claimed in claim 1 wherein the light detector may be a CCD arrangement to provide output to a frame grabber, and logic means are provided to analyse the output of the frame grabber for determining the presence of a valid binary code.

7. A method of reading light reflected from a laser reflection hologram including the steps of projecting a laser light beam onto the hologram to be read and positioning a light detector on the same side of the hologram as the laser light source for recognising a real image of the hologram and for discriminating said image from a non-valid image, said image being a bar code formed of a series of light reflective portions and light non-reflective portions, and wherein a triggering image is formed to indicate the presence of an information image area and to reflect the laser light beam at a different angle to that reflected by an information image formed to indicate the presence of said non-reflective portions, said information image being detected by a light detector which is activated only when triggered by a signal from a further light detector positioned to indicate the presence of the light reflective portion derived from the triggering image.

8. An apparatus for reading light reflected from a hologram in combination with a hologram for security markings comprising a laser transmission hologram known per se formed as a surface relief pattern embossed into an embossable material, said laser transmission hologram being formed by sequential layers of a carrier layer, an embossable thermo-plastic lacquer into which the hologram is formed, and a layer for adhesively bonding the hologram to a substrate, a thin metallic layer coated onto said thermoplastic lacquer whereby the laser transmission characteristics of the hologram are transformed into laser reflection characteristics capable of reflecting light from a laser, and wherein said hologram comprises an information image and a triggering image, said apparatus comprising a laser light source for projecting a laser light beam onto the hologram to be read, light detector means including means for receiving laser light reflected from the information image and means for receiving laser light reflected from the triggering image, said information image light receiving means being in communication with said triggering image receiving means so as to be activated only when triggered from a signal from said triggering image receiving means, said information image light receiving means being connected to a logic means for detecting the presence of a valid reflected signal.

9. An apparatus as claimed in claim 8 wherein said information image receiving means is adapted to be at a different angular position with respect to the plane of the hologram images from the triggering image receiving means.

* * * * *